May 17, 1938. C. M. BURNETT 2,117,701

TAKE-UP DEVICE

Filed Feb. 1, 1936

Inventor
CLARENCE M. BURNETT
By Paul, Paul + Moore
ATTORNEYS

Patented May 17, 1938

2,117,701

UNITED STATES PATENT OFFICE 2,117,701

TAKE-UP DEVICE

Clarence M. Burnett, St. Paul, Minn., assignor to Lewis Bolt & Nut Company, Minneapolis, Minn., a corporation of Minnesota Application February 1, 1936, Serial No. 61,988

1 Claim. (Cl. 267—72)

This invention relates to new and useful improvements in the so-called spring-type expansion take-up, and an object of the invention is to provide such a device of extremely simple and inexpensive construction, which is light in weight, and in which the relatively movable parts are so arranged that a minimum of friction is developed therebetween, when the device is subjected to tensional strains, which may be caused from various reasons as, for example, contraction, shocks imparted thereto, etc.

A further object is to provide a take-up device comprising a pair of elongated tension members, each provided with a head at one end, and each head having an aperture therein for slidably receiving the other member, and said heads providing seats for the ends of a suitable compression spring which constantly tends to urge the heads away from each other.

A further object is to provide a take-up device comprising a pair of bolts provided with suitable heads having guide openings therein through which the stems of the bolts are slidably supported, and a suitable spring being interposed between said heads and constantly urging the bolts in opposite directions, and suitable strengthening fins or ribs being provided to strengthen the head and prevent it from flexing relatively to its respective bolt, when subjected to a sudden shock or abnormal load.

Other objects of the invention reside in the particular construction of the bolts or rods of the take-up device, each of which is provided with a head disposed eccentrically with relation thereto, and each head having a guide opening therein through which said bolts are slidably received and whereby the bolts are disposed in parallel relation and substantially contact each other, whereby the line of pull is located in substantially the axis of the coiled spring interposed between the heads of the bolts.

Other objects of the invention will appear from the following description and accompanying drawing and will be pointed out in the annexed claim.

In the accompanying drawing there has been disclosed a structure designed to carry out the various objects of the invention, but it is to be understood that the invention is not confined to the exact features shown as various changes may be made within the scope of the claim which follows.

Figure 2:
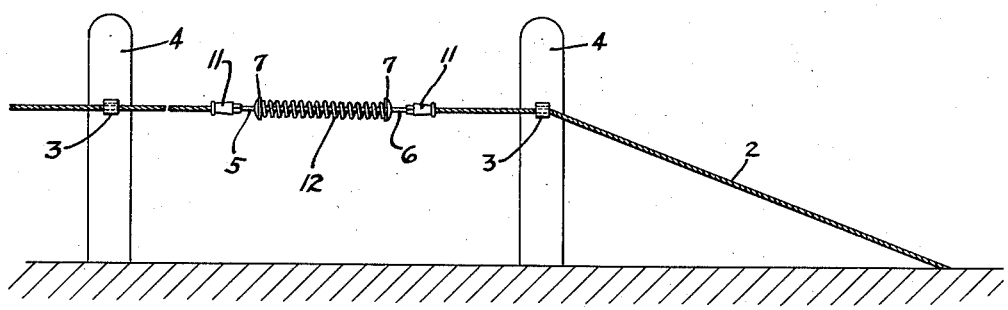
Figure 2 is a view showing the device embodied in the construction of a conventional guard rail cable.

In the selected embodiment of the invention here shown, there is illustrated in Figure 2, for purposes of disclosure, a conventional guard rail or cable 2, shown slidably supported in suitable guides 3 secured to the usual posts 4 arranged along the highway.

Figure 1:
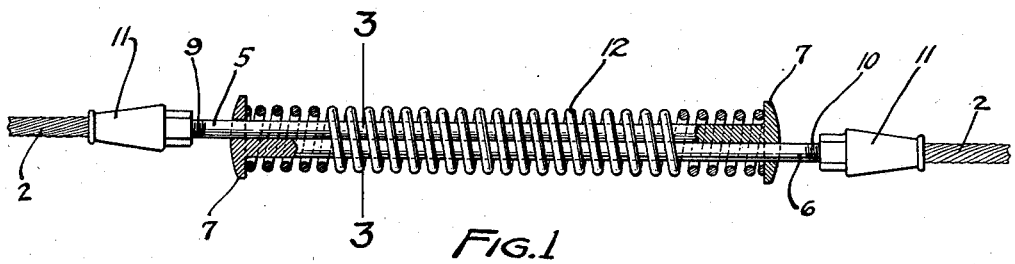
Figure 1 is a detail view, partially in section, illustrating the general construction of the take-up device.
Figure 3:
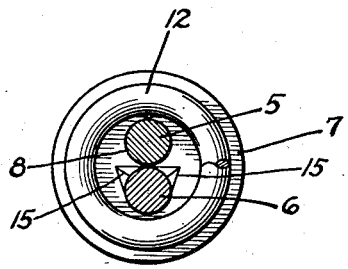
Figure 3 is a cross-sectional view on the line 3—3 of Figure 1, showing the arrangement of the rods or bolts within the coiled spring.
Figure 4:
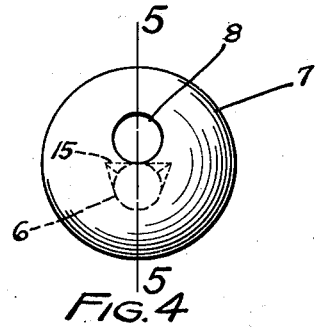
Figure 4 is an end view of one of the bolts, showing the head eccentrically disposed with relation thereto.
Figure 5:
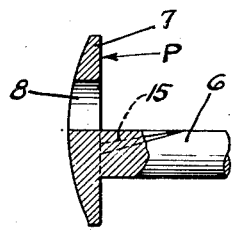
Figure 5 is a detail sectional view on the line 5—5 of Figure 4.

The take-up device is best shown in Figure 1, and comprises a pair of elongated rods 5 and 6, preferably similarly shaped, and each having a head 7 which, as best shown in Figures 4 and 5, are preferably eccentrically disposed relatively to their respective rods. Each head has an aperture 8 adapted to receive the adjacent rod, as clearly illustrated in Figure 1, and whereby the two rods are retained in parallel relation and substantially contact each other the greater portions of their lengths.

Suitable strengthening fins or ribs 15 are provided adjacent each head 7 and are integrally formed with the bolt head and bolt body. The ribs are relatively large at the point where they unite with the bolt head and taper downwardly therefrom along the bolt body, as best shown in Figure 5. The upper enlarged portions of the ribs have portions which are tangentially disposed with respect to the bolt body and intersect the axis of the bolt head and extend outwardly in opposite directions, thereby to provide maximum strength at the juncture between the bolt head and body. By thus forming the ribs 15, they adequately strengthen the connection between the heads and their respective bolt bodies and restrain the heads from flexing in the direction indicated by the arrow P in Figure 5, when the device is subjected to a severe load or shock.

The rods 5 and 6 have their outwardly projecting terminals 9 and 10 threaded, as shown in Figure 1, and adapted to receive suitable fittings 11, which are shown secured to the cable 2. The terminals 9 and 10 of the rods are preferably provided with right and left hand threads to facilitate connecting them to or disconnecting them from the fittings 11, as will readily be understood by reference to Figure 1.

A suitable spring 12 is coiled about the rods 5 and 6 and has its ends seated against the heads 7 of the rods, as clearly illustrated in Figure 1. This spring constantly urges the heads 7 in opposite directions, and when tension is applied to the cable 2, takes the load or shock imparted thereto, thereby relieving the cable of sudden shocks and severe strains, to which it might otherwise be subjected.

An important feature of the invention resides in arranging the rods 5 and 6 in close proximity, as shown in Figure 1, whereby the pull exerted thereon by the cable will be substantially in axial alinement with the spring. In other words, by so arranging the rods, lateral strains in the take-up device are substantially eliminated, and the rods will slide freely in the guide openings 8 when a pull is exerted upon the cable 2.

The novel take-up device herein disclosed has been found very useful in connection with guard rail cables, such as shown in Figure 2, because of its unique construction whereby it readily yields under pressure and, at the same time, maintains the cable 2 taut. The device is very simple and inexpensive and may readily be taken apart, when necessary, by simply disconnecting the rods from the fittings 11, after which the rods may be conveniently pulled apart to disengage them from the spring 12.

In the drawing, I have shown the take-up device, as used in connection with a conventional guard rail cable, but it is to be understood that it may be used for various other purposes where applicable, without departing from the scope of the invention.

I claim as my invention:

In a device of the class described, a pair of rods each provided with an offset head, said heads having guide openings therein adapted to receive said rods, thereby to operatively connect them together in closely spaced parallel relation and whereby the rods are adapted for relative sliding movement, strengthening ribs integrally formed with the bolt heads and their respective bodies and having relatively large portions secured to the bolt head and tapering downwardly therefrom along the bolt body, the portions of said ribs adjacent the bolt heads being disposed in tangential relation to the peripheries of the bolt bodies and extending outwardly in opposite directions and having portions substantially intersecting the axis of the bolt heads, thereby to provide maximum strength between the bolt heads and bodies, and prevent flexing of the bolt heads when the device is subjected to a shock or abnormal load, a suitable compression spring coiled about the intermediate portions of said rods and having its ends seated against said heads, and means for attaching cables to the ends of said rods.

CLARENCE M. BURNETT.